UNITED STATES PATENT OFFICE.

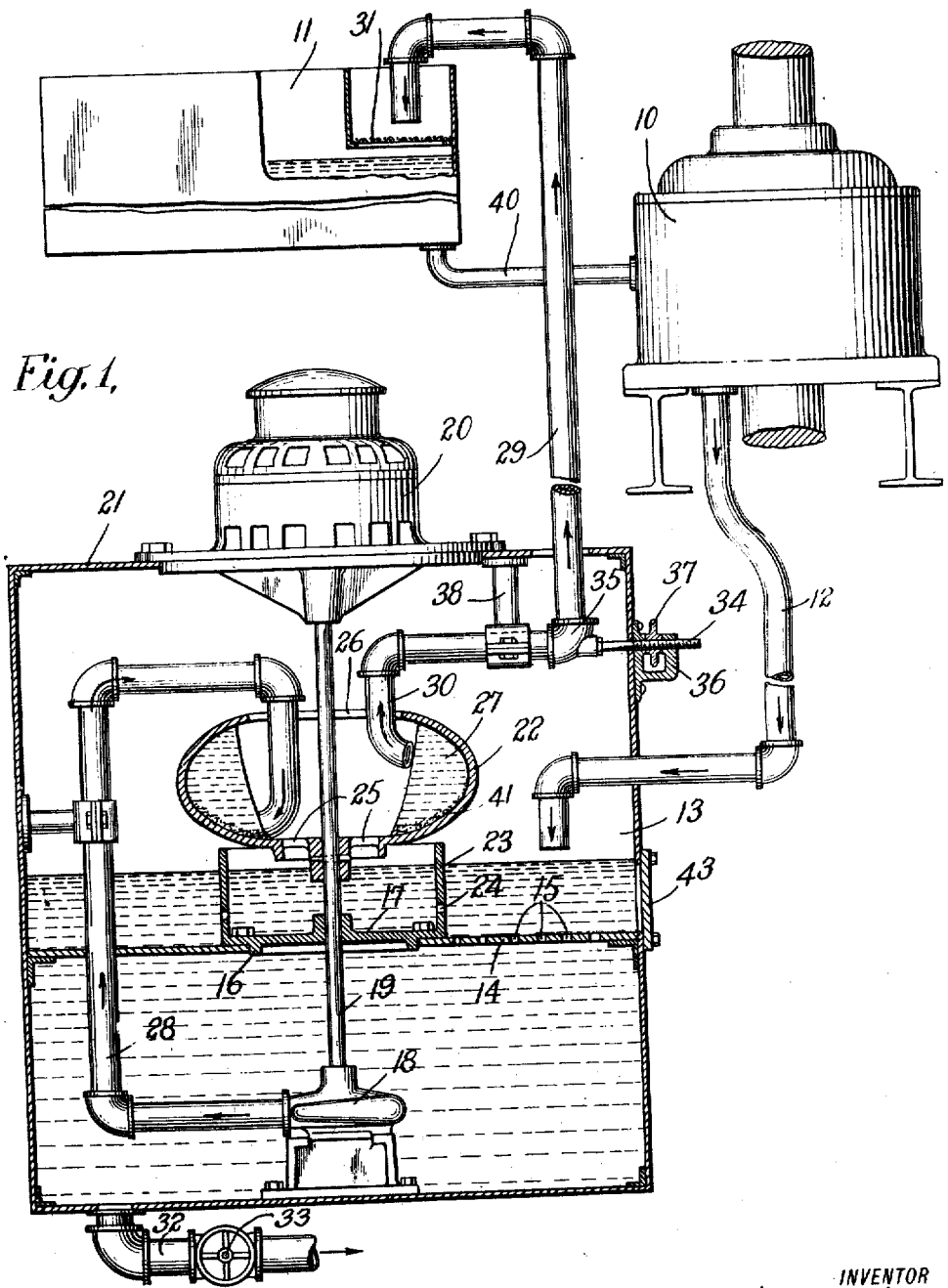

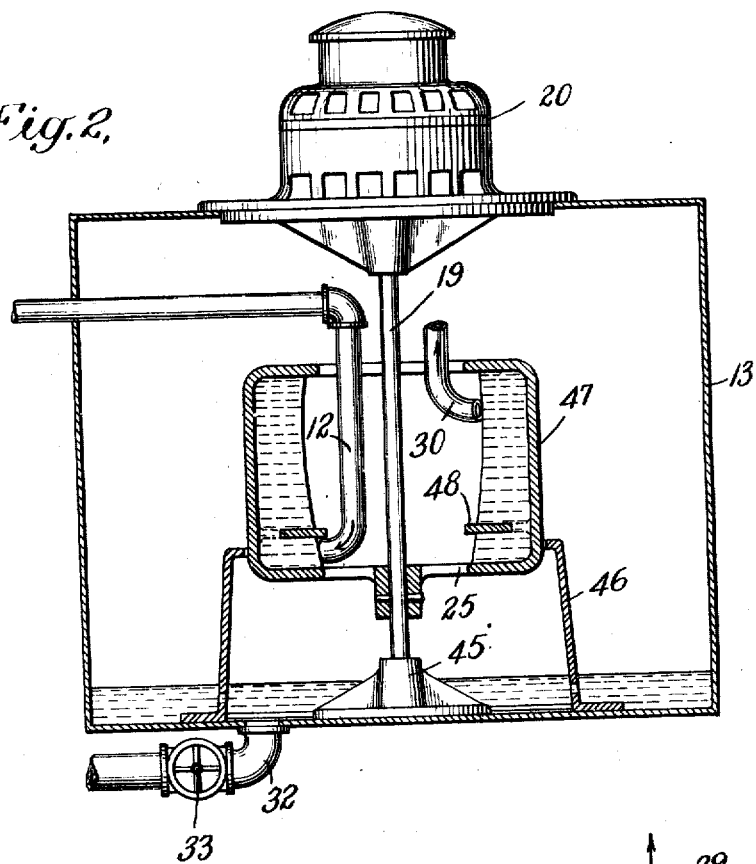
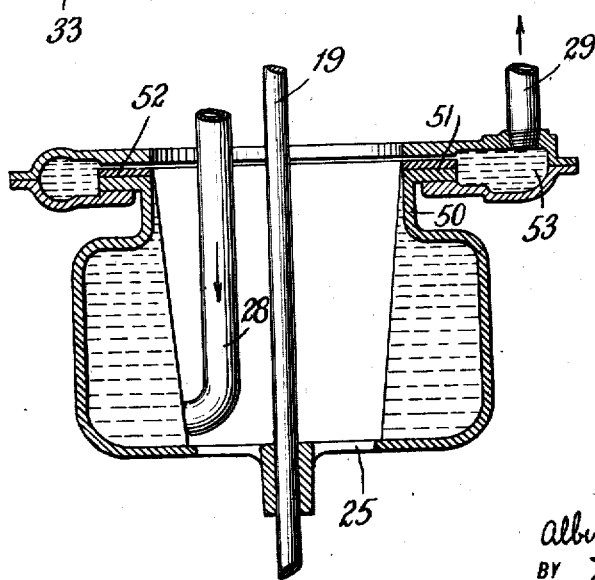

ALBERT KINGSBURY, OF PITTSBURGH, PENNSYLVANIA.

OIL PURIFIER AND PUMP.

1,242,560.

Specification of Letters Patent.   Patented Oct. 9, 1917.

Application filed January 21, 1915.   Serial No. 3,457.

*To all whom it may concern:*

Be it known that I, ALBERT KINGSBURY, a citizen of the United States of America, and a resident of Pittsburgh, county of Allegheny, and State of Pennsylvania, have invented certain new and useful Improvements in Oil Purifiers and Pumps, of which the following is a specification, reference being had to the accompanying drawings, forming a part thereof.

My invention relates to the separation of solid matter from liquids, the separation of liquids of unlike specific gravities, and the pumping of liquids. More particularly my invention relates to the purification and the forced circulation of lubricating oil.

One object of my invention is to provide a centrifugal means which shall act both as a separator and as a pump for purifying and lifting a liquid.

Another object of my invention is to provide a simple and effective apparatus adapted not only for separating lubricating oil from dirt, water, and other foreign matter, but also for forcing the pure oil into a bearing or into a reservoir from which it may be supplied for the lubrication of bearings.

Other objects and advantages of my invention will be set forth hereinafter, and in order that my invention may be thoroughly understood I will now proceed to describe the same in the following specification and then point out the novel features thereof in appended claims.

It is very usual, especially in large power plants, to supply various shaft bearings with oil through suitable piping, either from the pump direct or from an elevated tank or reservoir from which the oil flows by gravity. From the bearings the oil is drained into a sump tank or any suitable reservoir from which it is again supplied to the bearings or pumped into the reservoir above. In order to purify the oil some sort of filter has usually been employed somewhere in the system.

Systems of this character seldom supply perfectly clean oil to the bearings and the filters are particularly troublesome since they need frequent attention for cleaning, etc. It has been my aim to provide a mechanical device which will effectively separate water and heavy dirt of all kinds from the oil and will also act as a pump to force the pure oil into the bearings or into the overhead tank as desired.

Referring to the drawings:

Figure 1 is a partially diagrammatic sectional elevation of a system of lubrication embodying a pump and purifier arranged and constructed in accordance with my invention.

A modified pump and purifier structure is shown in Fig. 2, and

Still another modification is shown in Fig. 3.

The system shown in Fig. 1 comprises a bearing 10 to which lubricating oil is supplied from a reservoir or tank 11. Oil is drained from the bearing housing through a pipe 12 into a sump tank or some suitable receptacle 13.

Within this tank is disposed a horizontal plate 14 having perforations 15 and a central opening 16 in which a stationary bearing box 17 is seated. A rotary pump or other suitable means 18 is mounted within the tank below the horizontal plate 14 and comprises a rotor (not shown) which is secured to the lower end of a vertical shaft 19. This shaft extends upwardly through the bearing 17 and constitutes an extension of the shaft of a motor 20 which is mounted on the top plate or cover 21 of the sump tank. This motor may be of any suitable type, such as for example, an electric motor and serves not only to drive the pump 18 but also to whirl, or rotate at a high speed, a bowl or receptacle 22 which is secured to the shaft 19 between the bearing box 17 and the cover plate 21. The bearing box 17 has a flange 23 which is perforated as shown at 24, and constitutes a splash guard, the overflow from the whirling bowl escaping downwardly through openings 25 in the bottom of the bowl into the splash guard.

The horizontal plate 14 constitutes a dirt shelf as more fully pointed out hereinafter. The whirling bowl 22 is formed with curved sides and with an opening 26 in the top which is smaller in diameter than the maximum interior diameter of the bowl. Consequently, liquid will be pocketed in the bowl as indicated at 27 when the bowl is rotated at high speeds.

A pipe 28 leads from the pump 18 and transfers liquid from the bottom of the sump tank into the bowl, the end of the pipe extending downwardly near to the bottom of the bowl.

Another pipe 29 which terminates at its lower end in a receiving nozzle, provides communication from the bowl near its upper end into an elevated tank or reservoir 11. A strainer 31 is preferably provided in the tank 11 in order to remove chips or other light dirt which may be carried upwardly with the liquid from the bowl. The sump tank is provided with a drain outlet 32 at the bottom having a valve 33 which is normally closed.

The nozzle 30 may be adjusted radially relative to the bowl, by means of a screw-threaded rod 34 which is attached to the pipe 29 at 35 and extends through a suitable hole in the side of the tank 13 and through a bracket 36, a nut 37 being mounted on the screw-threaded rod between the arms of the bracket 36 which is bifurcated. The pipe 29 is supported by a hanger 38 in order to permit of the adjustment of the nozzle.

The operation of the system is as follows:—Assuming that clean oil is in the tank or reservoir 11, it is fed by gravity through a pipe 40 into the housing of the bearing 10 and after it has lubricated the bearings, is drained through the pipe 12 into the sump tank 13. The oil discharged into the sump tank carries a greater or less quantity of dirt and in order that clean oil may continually be supplied to the bearing without loss, the pump and purifier of my invention is provided. The dirty oil is forced by the pump 18 upwardly through the pipe 28 into the whirling bowl 22 which may be assumed to be rotating at a relatively high speed, the bowl and the pump being both mounted on the extension 19 of the motor shaft. The centrifugal action causes the liquid in the bowl to assume a form substantially as shown in Fig. 1 and whirls at a high speed with the bowl. The centrifugal forces tend to separate all heavy liquids and solid particles, such as water and particles of steel, from the oil, the forces easily obtainable by this means for this purpose being three to four hundred times as great as the force of gravity acting upon the oil if left to stand in a tank. While the oil might be purified very slowly by permitting it to stand in large tanks, it is difficult to make a continuous circuit system operate in this manner and by increasing the forces as I have done, by the use of my separating apparatus, the same result is obtained very rapidly. Furthermore, the receiving nozzle 30 is adjusted to dip into the liquid near the top of the bowl at a small inclination to the surface of the liquid, which by its own momentum is forced upwardly through the pipe 29 and is discharged continuously into the tank or receptacle 11 through the strainer 31. The heavy dirt and water is held near the bottom of the bowl as indicated at 41, as long as the whirling continues. For removing the collected impurities the motor is stopped and the dirt is then drained out with the liquid which flows from the bowl into the splash receptacle 23 and out through the openings 24 onto the dirt shelf 14. The shelf may be cleaned by removing a cap or hand-hole 43 when the level of the liquid is below the dirt shelf.

By this means the oil supplied to the tank or receptacle 11 is much purer than oil usually supplied to a bearing when filters of well known types are utilized for cleaning oil.

The purifying and pumping apparatus may be supplied in duplicate in order that one may be cleaned while the other is in service.

The pump 18 is not an essential part of the device as the head tank may be supplied initially by an independent pump and the oil drained from the bearing may flow directly into the whirling bowl. A structure adapted for this arrangement is shown in Fig. 2 to which reference may now be had. As here shown, a bearing 45 is located at the bottom of the sump tank 13 and is surrounded by a splash box 46. A whirling bowl 47 which corresponds to the bowl 22 is secured to the motor shaft extension 19 but is provided with a baffle ring 48 spaced from the bottom of the bowl and serving to retain any floating impurities. The drain pipe 12 from the bearing discharges directly into the bowl below the baffle ring 48 and the overflow from the bowl discharges through openings 25 into the splash box 46. The receiving nozzle 30 extends downwardly into the top of the bowl as in the structure of Fig. 1.

Another modification of the whirling bowl is shown in Fig. 3. This bowl has overflow discharge openings 25 in the bottom but has an upwardly extending neck 50 which is provided with a flange 51. This flange has vanes 52 which act as a pump and force the light, clean oil from the upper part of the bowl outwardly into a discharge ring 53 to which the outlet pipe 29 is connected. This structure is adapted to elevate the oil to a greater height than the arrangement of Figs. 1 and 2 which comprises the receiving nozzles and depend merely upon the whirling liquid. This bowl may be utilized either in place of the bowl 42 or the bowl 47.

Other modification may be provided within the spirit and scope of my invention, and I intend that only such limitations be imposed as are indicated in appended claims.

What I claim is:

1. A liquid purifier and pump comprising a stationary tank, a whirling receptacle therein above the liquid level in the tank, means for conducting liquid from the tank into the whirling receptacle, a receiving nozzle extending into the whirling receptacle from the top and adapted to conduct away the light liquid after the impurities are centrifugally separated therefrom, and a perforated splash guard receptacle in the tank below the whirling receptacle.

2. A liquid purifier and pump comprising a stationary liquid containing tank, a whirling receptacle within the tank above the liquid level therein, a motor for driving the receptacle, a pump operatively connected to the motor for transferring the liquid from the tank to the whirling receptacle near the bottom, an outlet pipe for conducting away clean liquid, and means dependent upon the whirling receptacle and the liquid therein for forcing the liquid therefrom into the outlet pipe.

3. A separator and pump comprising a rotatable receptacle formed to provide an annular pocket, a central opening at the base of the receptacle, an opening in the top of the receptacle of larger diameter than the base opening, and a radial flange adjacent to the top opening and having propelling means for elevating relatively light liquid from the receptacle.

4. A separator and pump comprising a rotatable receptacle, means for supplying liquid to the receptacle near the bottom, a contracted neck at the top of the receptacle having a radial flange, propeller vanes on said flange, and a stationary annular discharge chamber adapted to receive liquid which is forced outwardly from the top of the receptacle by said propeller vanes.

5. A liquid purifier and pump comprising a whirling receptacle, means for supplying liquid thereto near the bottom, a receiving nozzle extending into the receptacle and adapted to conduct away the light liquid therefrom near the top, and a splash guard receptacle directly below the whirling receptacle, the latter having an opening at the bottom near the axis from which dirt is discharged into the splash guard receptacle.

6. A liquid purifier and pump comprising a whirling receptacle having an annular pressure chamber communicating with the receptacle near the top, means for driving the receptacle, means for supplying liquid to the receptacle near the bottom, a plurality of pumping members attached to the receptacle for maintaining pressure in the chamber and an outlet pipe connected to the pressure chamber and adapted to receive clean liquid therefrom.

7. A liquid purifier and pump comprising a tank, a driving shaft therein, a whirling receptacle mounted on the driven shaft and having openings at the top and bottom, a pump mounted on the same shaft and connected to deliver liquid from the tank to the whirling receptacle, a screen or partition in the tank, a splash guard receptacle supported by the screen or partition and adapted to receive dirt from the bottom of the whirling receptacle.

8. A separator and pump comprising a rotatable receptacle formed to provide an annular pocket, a central opening at the base of the receptacle, an opening in the top of the receptacle of larger diameter than the base opening, a radial flange adjacent to the top opening and having propelling means for elevating relatively light liquid from the receptacle, and a perforated splash guard receptacle directly below the rotatable receptacle and adapted to receive dirt from the base opening thereof.

In testimony whereof I have hereunto set my hand this 19th day of January, 1915, in the presence of two subscribing witnesses.

ALBERT KINGSBURY.

Witnesses:
C. W. McGhee,
John A. Elden.